United States Patent [19]

Metcalf

[11] 4,115,77[3]

[45] Sep. 19, 197[8]

[54] SYNCHRONIZED PULSE AMPLITUDE CONTROL FOR PULSE MEASURING CIRCUITS

[75] Inventor: James E. Metcalf, Arlington, Tex.

[73] Assignee: Del Norte Technology, Inc., Euless, Tex.

[21] Appl. No.: 764,717

[22] Filed: Feb. 2, 1977

[51] Int. Cl.² .......................... G01S 7/34; G01S 9/02
[52] U.S. Cl. ................................................ 343/7 AG
[58] Field of Search ...................................... 343/7 AG

[56] References Cited

U.S. PATENT DOCUMENTS

| | | | |
|---|---|---|---|
| 2,579,497 | 12/1951 | Isbister | 343/7 AG X |
| 2,728,852 | 12/1955 | Moran, Jr. | 343/7 AG X |
| 3,168,731 | 2/1965 | Shub et al. | 343/7 AG X |
| 3,487,405 | 12/1969 | Molho et al. | 343/7 AG X |
| 3,518,668 | 6/1970 | Woolvin | 343/6.8 LC |

FOREIGN PATENT DOCUMENTS 719,915  12/1954  United Kingdom ................. 343/7 AG

*Primary Examiner*—Malcolm F. Hubler

[57] ABSTRACT

A standard amplitude pulse is transmitted as a cyclically recurring pulse in a radar ranging system. At a receiver identified by the pulse repetition rate of the recurring pulses, each pulse is analyzed for its deterioration from the standard in order to detect fading. An amplifier, having a controlled gain, is adjusted responsive to the analysis, and the uniformity is restored to the pulse despite variations in fading. In some cases, a threshold detection is used to prevent response to minor variations. A pulse repetition rate detector insures that the pulses are so controlled at only the identified station, and that the identified station responds only to pulses with the proper repetition rate.

9 Claims, 4 Drawing Figures

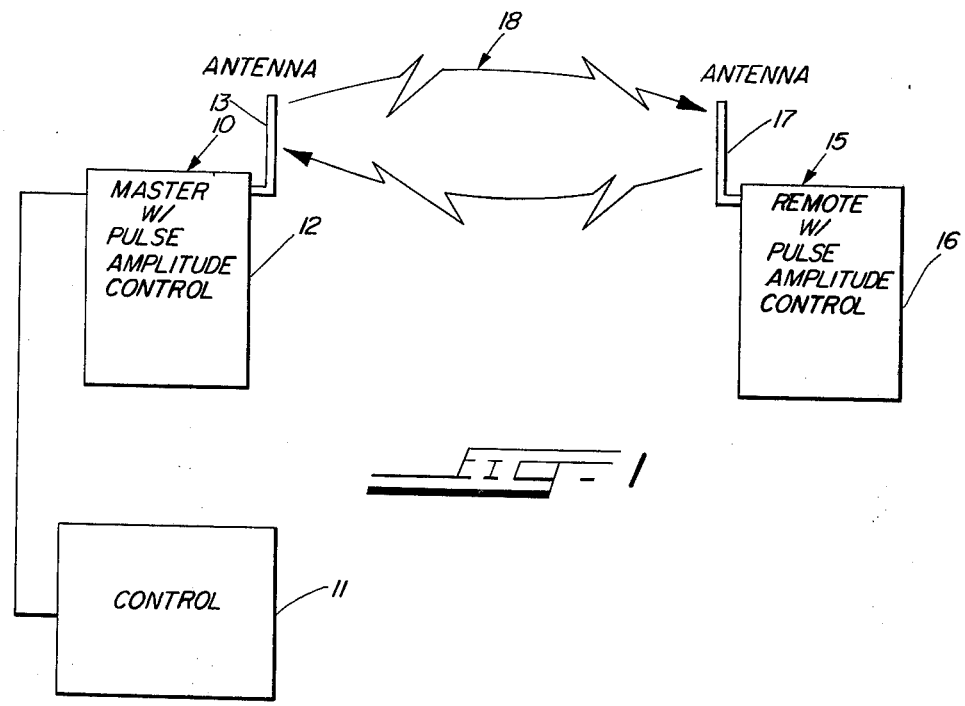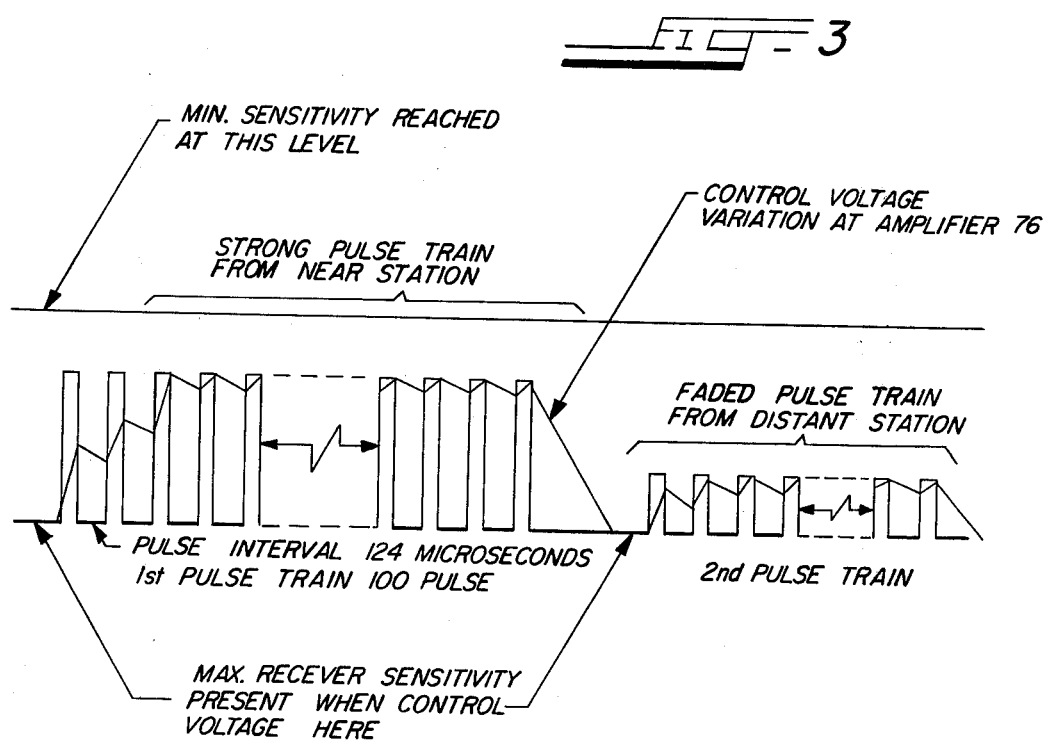

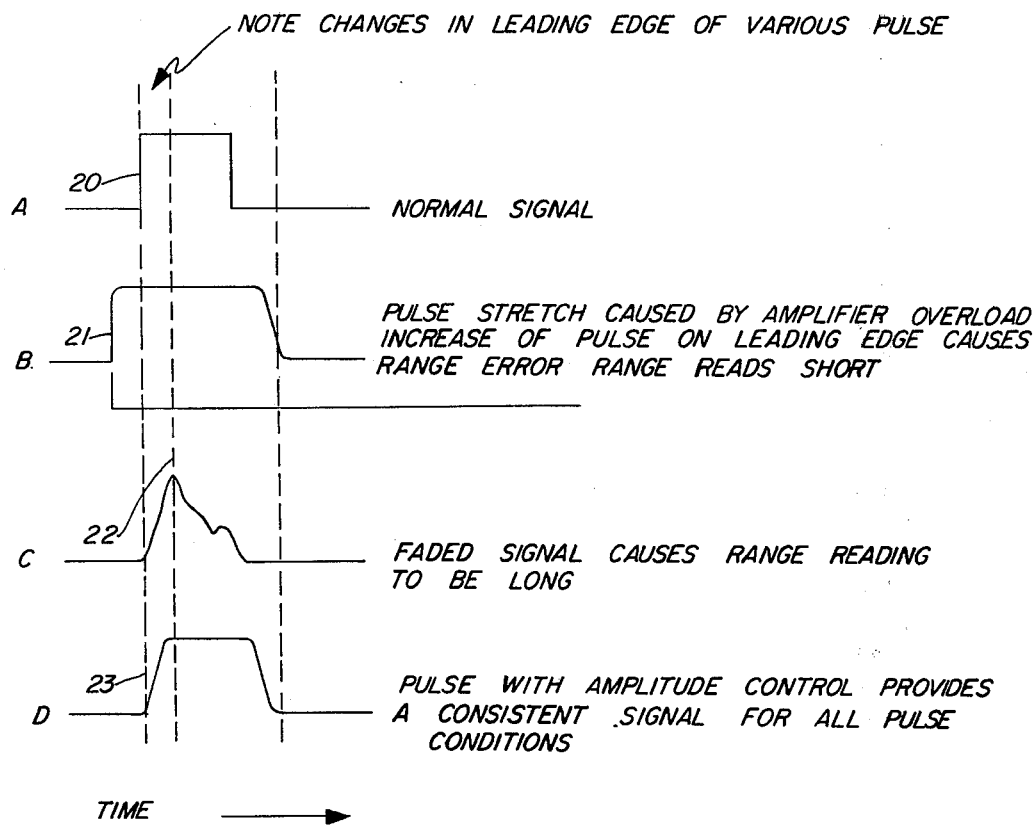

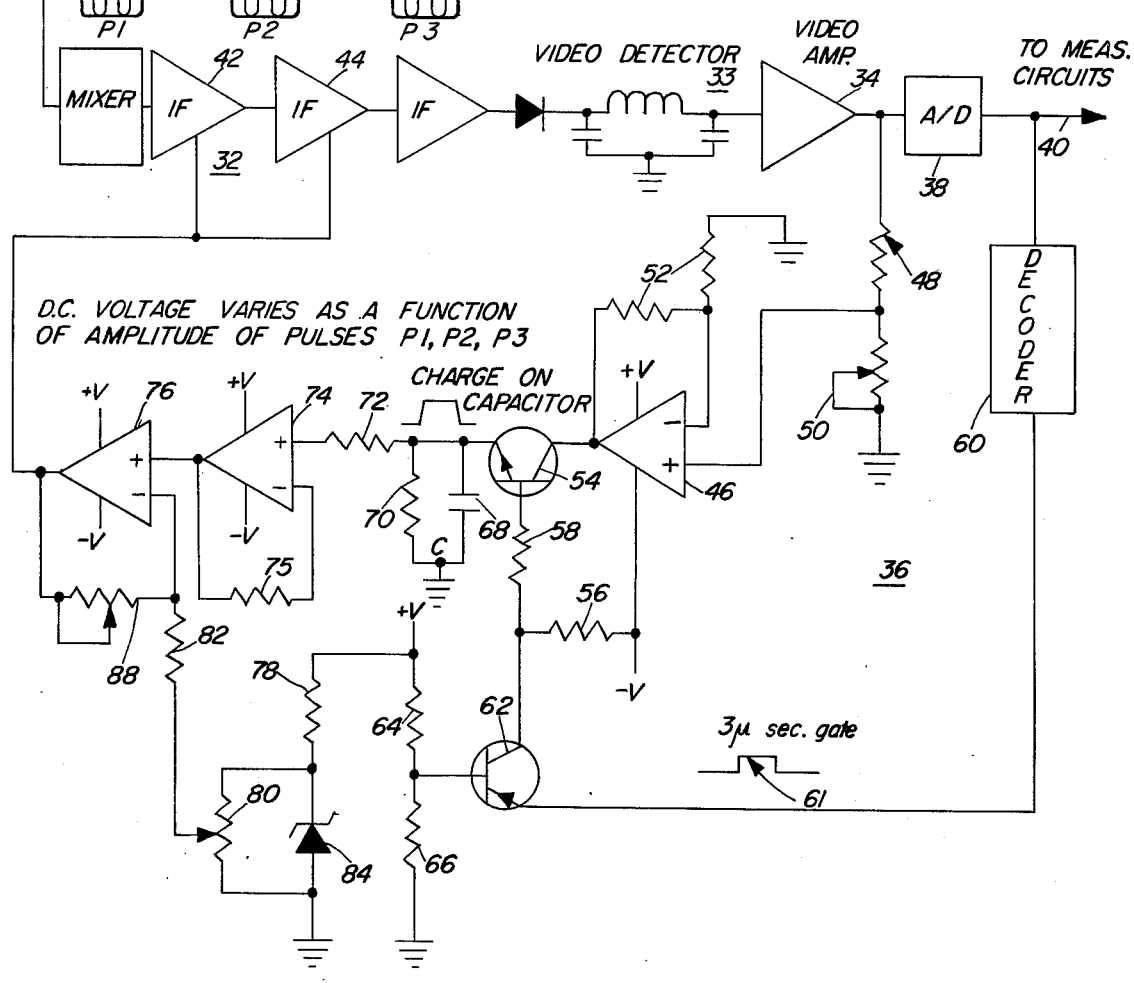

SYNCHRONIZED PULSE AMPLITUDE CONTROL FOR PULSE MEASURING CIRCUITS

This invention relates to radio ranging systems using transmitted pulses of radio frequency energy, and more particularly to systems for reduced ranging errors caused by signal fading.

Many known systems, such as radar systems, transmit high frequency radio pulses over distances to provide ranging information. Usually, there is a transmission of a pulse which starts the measurement of a time period. The pulse travels over a round trip to a target and back. When it is received, the measurement of the time period is stopped. The total elapsed time during the measured period is an indication of the distance over which the pulse travels.

A difficulty arises since, during transmission, the pulses may lose their shape owing to poor atmospheric radio frequency transmission characteristics. As the pulses change their shape, one of their critical dimensions may effectively move back or forth in time to change the duration of the measured period and thereby to appear to change the transmission or propagation time, with a ranging error resulting therefrom. These variations of pulse shape are difficult to deal with because atmospheric conditions change continuously to cause unpredictable instantaneous signal fading in varying degrees. If the received pulses are amplified at a standard gain, the fading caused errors are enhanced.

Prior art attempts to solve these problems have generally failed. One approach has been to provide receiver amplifiers having the largest practical gain to compensate for the worst case fading error. Then, the system noise is also amplified and the signal is sometimes lost in the general background of noise. Also, the excessive gain of indiscriminate amplification sometimes causes the amplifier to become unstable. If the transmission distances are very short, the received signal may be so strong that it overdrives the amplifier and causes distortion.

To overcome these and similar problems, the prior art has also attempted to do a number of things in order to compensate for standard amplification of all signals. One approach has been to provide calibration curves which could be consulted to interpret distortion and to give a more accurate reading.

Another approach is to provide an amplifier with a gain which is held at a low level for an initial period after the transmission of every ranging pulse. After the initial period, the gain automatically increases. This way, the gain is low for pulses received from nearby transmitters, with little loss likely to be caused by fading. The high gain is applied to pulses received from distant transmitters with a greater probability of relatively great fading loss. However, this approach did not work very well because the variables of atmospheric transmission could be predicted. Sometimes losses are opposite to the anticipated levels.

Accordingly, an object of the invention is to reduce ranging errors, especially those caused by pulse shape distortion. Here, an object is to automatically adjust receiver gain as a function of the existing instantaneous transmission characteristics.

A particular object is to provide amplification for ranging pulses, with a gain which varies as a function of signal fading.

A further object is to provide an amplifier having dynamic and self-adjusting gain.

Yet another object of the invention is to recreate standard pulse, insofar as rise time and amplitude are concerned, in order to provide a base measurement, and to create pulses such that one pulse is consistent with the next pulse.

In keeping with an aspect of this invention, these and other objects are accomplished by transmitting all ranging pulses with a closely controlled amplitude. If the received pulse has a standard amplitude, the amplifier operates with an unadjusted standard gain. If the amplitude of the received pulse is less than the standard amplitude, the amplifier gain is increased until the received pulse is restored to the standard level. This way the amplifier gain in the receiver is automatically varied a a function of the amplitude of the received pulse.

The nature of a preferred embodiment may be understood best from a study of the attached drawing wherein:

FIG. 1 shows an exemplary radar system using a trilateralization distance measuring process;

FIG. 2 includes wave forms showing how ranging errors occur responsive to a deterioration or change in pulse shape;

FIG. 3 shows two exemplary pulse trains, as they are received, after having been transmitted over different distances; and FIG. 4 shows a circuit for controlling the amplitude of a received pulse in order to restore it to a desired standard.

In greater detail, FIG. 1 broadly shows a radar ranging system using trilateralization for measuring distances. There is a master station 10 comprising a central control unit 11, a transceiver 12, and a transmitting and receiving antenna 13. Remotely located at each of any suitable number of selected geographical points are a plurality of remote stations, an exemplary one of which is seen at 15. Each of these remote stations has a transponder 16 with its own antenna 17. The transmission between the master and remote stations is via separate send and receive radio channels 18. The signals transmitted via channels 18 are subject, in varying degrees, to fading as a result of variations in atmospheric transmission conditions.

All of these remote stations 15 may be tuned to the same radio carrier frequencies for both receive and send channels. Therefore, all such remote stations may listen and respond on the same commonly used carrier frequencies. However, it is necessary to provide some form of station identification so that each of the various remote stations 15 responds only when it is specifically addressed.

In the "Trisponder" trilateralization system, each of the system stations is identified in a very simple and straightforward manner. More particularly, the radio carrier frequency is interrupted in the transmitting station at any one of many different predetermined pulse repetition rates so that a steady stream of cyclically recurring interrogation pulses are transmitted. Each of the receiving stations is adapted to respond only when it receives interrogation pulses which recur at the particular pulse repetition rate which is assigned to identify it. This way the master station 10, for example, may select any one or more of the desired remote transponders and only that selected transponder replies.

One difficulty which has been encountered is that the radio transmission channels 18 are likely to cause deterioration of signals owing to propagation nulls, weather conditions, overloads, and the like. As a result, the transmitted signals are subject to random fading or other forms of transmission aberrations which adversely affect pulse shape. Consequently, substantial ranging errors have occurred.

Accordingly, there is a need to provide a local gain control at the receiving end of each transmission channel (e.g., at transponder 16, when master station 12 is transmitting). To do this, each of the stations is adapted to transmit all interrogation signals at a closely controlled pulse amplitude. Thus, the receiving system knows that it should be receiving signals at a standard amplitude. Hence, it may be adapted to analyze the received interrogation signals and to detect any variance from the anticipated standard pulse amplitude. If there is a significant reduction in the amplitude of the received pulses, it probably means that there has been a fading of the signal during transmission. Therefore, the receiver gain may be automatically adjusted to compensate for the fading as represented by the loss in amplitude. This receiver gain adjustment may thereby undo the random weather caused aberrations.

In FIG. 2, curve A shows an exemplary ranging pulse, having a standard pulse amplitude, as normally transmitted. Curve B shows how this normal pulse might be distorted when transmitted over very short distances if it is overamplified at a receiver. Curve C shows how this same normal pulse might be distorted when transmitted over long distances, with a substantial amount of fading. Curve D shows how each of these pulses may be amplified at the receiver in order to provide a standard received pulse having the same pulse shape, which is free of ranging errors.

The nature of the problems caused by these pulses may become more apparent from an inspection of the curves in FIG. 2. More particularly, perhaps the most serious problem is seen at the leading edge of each pulse. When the strong pulse (FIG. 2B) received from a nearby station is overamplified, the leading edge moves from its original position 20 to an advanced position 21, which makes this pulse appear to have been received sooner than it actually was received. This causes the measured range to appear to be shorter than it actually is.

When a ranging pulse fades (FIG. 2C), its initially square shape tends to round off into a randomly nondescript peak, with a maximum amplitude at almost any point along the time scale. As a result, the leading edge 22 is apparently delayed in time, as compared to its original position 20. Hence, the measured range appears to be longer than it actually is.

However, with the invention, either of the exemplary pulses of FIG. 2B or FIG. 2C may be given the same standard amplitude pulse shape, as shown in FIG. 2D. The leading edge 23 of this standard amplitude pulse shape always has the same position relative to the original leading edge position 20. Thus, regardless of whether there was a short range with a stretched pulse (FIG. 2B) or a long range with a faded pulse (FIG. 2C), the receiver always responds to the same standard pulse, in the same manner.

FIG. 3 shows two exemplary pulse trains that might be received after they have been transmitted over two different distances. The received signals have different amplitudes. If these two pulse trains are received at one station, for example, they may follow each other by only 10-15 milliseconds. For example, the central station 10 may sequentially receive successive signals from each of many different remote sections 15. Thus, the central station 10, in this example, must very quickly recognize these differences in amplitude, adjust its receiver gain, and then restore its receiver to its maximum sensitivity, so that it will be ready for the next pulse train. If fading occurs within the pulse train (i.e., while the pulse train is being received), the local amplifier gain is also adjusted. The control voltage variation is such that, regardless of whether the received signal is a strong pulse train from a near station or a faded pulse train from a distant station, the usable signal will always be amplified to have the same amplitude.

According to the invention, until a system receiver recognizes its identifying pulse repetition rate of transmitted pulses, the receiver amplifier gain is set at a maximum. Once a pulse repetition rate is recognized, the identified receiver corrects its gain very rapidly because it is operating on a pulse width which is approximately 0.5 microsecond. By the time that the measuring sequence begins, the gain must be completely adjusted. Therefore, after approximately two or three pulses, the system is completely settled (i.e., the correction voltage reaches its desired level).

The manner in which a system using the invention may be constructed should become more apparent from a study of FIG. 4. In greater detail, FIG. 4 shows a receiver portion of a radar distance measuring system which may be used in the "Trisponder" trilateralization system. The object of this receiver portion is to improve the range accuracy by controlling the receiver characteristic to more accurately process and shape the actual incoming pulses. This system should be distinguished from prior systems which merely process signals according to a theoretical pulse shape which should be received, after having undergone some preselected amount of standardized fading or other distortion.

The major divisions of FIG. 4 are the front end 32 of a radar receiver (i.e., the antenna, RF receiver, and IF amplifiers), a video signal detector 33, a video amplifier 34, and a feedback control circuit 36. The incoming radar pulses are interruptions of a carrier frequency $C_f$, as shown at $P_1$, $P_2$, $P_3$, . . . , by way of example. The circuits 32, 33 are conventional and may be of any well known design. The received radar pulses are amplified and shaped by the video amplifier 34. An analog-to-digital converter 38 then converts the received signals into digital signals. At 40, these digital signals are forwarded to any suitable and conventional circuits, for further processing.

The feedback control circuit 36 analyzes the incoming pulses and adjusts the gain of the IF stages 42, 44 in the front end 32 of the receiver, in order to restore the desired pulse characteristics. For this purpose, the pulses are fed to the positive input of an amplifier 46, via a voltage divider 48 having an adjustable level setting device 50. The resistors 52 set the bias potentials in amplifier 46 and provide bias for an NPN transistor 54, used in an emitter-follower configuration. The normal base bias for transistor 54 is set to switch it off responsive to a voltage $-V$, which is applied through the series resistor circuit 56, 58.

Simultaneously, the output of the analog-to-digital converter 38 is fed through a decoder 60, which is adapted to respond to only the pulse repetition rate that identifies this particular receiver. Decoder 60 produces a gate pulse 61 only when the station detects its own identifying pulse repetition rate. Therefore, a gate pulse 61 reappears at the time of each of the pulses $P_1$, $P_2$, $P_3$, ... etc. of interrupted carrier frequency $C_f$, that recur at the station identifying pulse repetition rate.

If the incoming radar pulses have the desired pulse repetition rate, the gate pulses 61 forms an emitter bias for switching on a transistor 62. Then, the transistor 62 applies a new bias potential to the junction between resistors 56, 58, and therefore to the base of transistor 54, which switches on. Resistors 64, 66 form a voltage divider for biasing the base of transistor 62.

When the transistor 54 switches on, the output of amplifier 46 is applied to the combination of the capacitor 68 and resistor 70, when a sample representative of each receive pulse is stored. As they are received, a sample of each of the successive radar pulses charges the capacitor 68 to a voltage level which is proportional to the average amplitude level of the incoming radar signals $P_1$, $P_2$, $P_3$, ...

After a few pulses have been received, this voltage level stabilizes and thereafter remains stable for the duration of the incoming pulse train (FIG. 3). Hence, the average potential applied from capacitor 68 through resistor 72 to the input of the amplifier 74 varies as a function of the amplitude of the received signal. If the signal has faded (2nd pulse train, FIG. 3), this applied potential is lower by a degree which reflects the amount of the fading. Amplifier 74 acts as a buffer to isolate the amplifier 76 from the preceding circuitry, except for the transmitted signal. Resistor 75 provides negative feedback to stabilize and to set the gain of the amplifier 74.

The output of amplifier 74, which is proportional to the amplitude of the received signals $P_1$, $P_2$, $P_3$, ..., is applied to the positive input of amplifier 76. The negative input to this amplifier 76 is biased from a positive potential $+V$ which is applied via resistor 78, a potentiometer 80, and a resistor 82. A Zener diode 84 sets a very stable voltage level for this bias potential. A potentiometer 88 adjusts the gain of the amplifier 76.

It should now be apparent that the output voltage of the amplifier 76 swings with the instantaneous voltages which vary as a function of and proportional to the amplitude of received pulses. This output voltage level is a signal which controls the gain of the IF amplifiers 42, 44. An adjustment of the potentiometer 80 provides a threshold level of sensitivity. Thus, the incoming pulse train $P_1$, $P_2$, $P_3$, ..., must have an amplitude characteristic which crosses this threshold level before there is an automatic adjustment of the gain in the IF amplifiers 42, 44.

The end result is that the outgoing signals, appearing at the terminal 40, always have approximately the same characteristics regardless of how they may or may not have deteriorated responsive to changes in the instantaneous transmission characteristics.

Those who are skilled in the art will perceive how modifications may be made in the invention. Therefore, the appended claims are to be construed to cover all equivalents falling within the true scope and spirit of the invention.

I claim:

1. A pulse amplitude control circuit for a radio ranging system wherein received radar pulses continuously recur at a predetermined repetition rate, said circuit comprising means for transmitting radar ranging pulses at said predetermined rate with closely controlled characteristics, receiver means having a controllable gain for receiving and forwarding said radar ranging pulse for data processing, gate means driven at said predetermined rate for feeding back as gate pulses signals derived from said forwarded pulses responsive to received radar pulses whereby said gate means feeds back said gate pulses only if the received radar pulses recur at the predetermined rate, and means responsive to said fed back gate pulses for adjusting said controllable gain for the duration of said gate pulses to provide a standard amplitude amplitude radar pulse responsive to deviations of the received pulse from the controlled characteristic of the transmitted pulse, said standard amplitude pulse being usable by said data processing means.

2. The circuit of claim 1 and means associated with said feedback means for storing a sample of each of the ranging pulses as it is received, whereby an average of said stored samples represents an average amplitude of the received pulses and therefore the fading which has occurred during transmission of said ranging pulses.

3. The circuit of claim 1 and means for detecting the pulse repetition rate of said ranging pulses as they are received, and means responsive to said predetermined repetition rate for enabling said feedback in order to adjust the controllable gain.

4. The circuit of claim 1 and means for setting a threshold level for characteristics of received pulse which must be crossed before said feedback has an effect upon said controllable gain, whereby said receiver means is not adjusted until said ranging pulse have faded a predetermined amount.

5. A process for measuring distances comprising the steps of:
 (a) transmitting at a predetermined pulse repetition rate a plurality of recurring radar ranging pulse with closely controlled amplitude characteristics whereby a deviation of said amplitude from the normal of the characteristics of received pulses is attributable to transmission losses;
 (b) sampling a characteristic of said received pulses at said predetermined rate to set the level of a control signal if a radar ranging pulse is then present; and
 (c) reconstituting the time positions of said ranging pulses if they recur at said predetermined rate, said reconstituted time positions being responsive to said control signal in order to provide a standard time position for said received pulses despite variations in instantaneous transmission losses.

6. The process of claim 5 wherein said time position is the initial position of maximum amplitude of said received pulses, whereby said time position appears to change as the shape of received pulses deteriorates.

7. The process of claim 6 wherein step (c) comprises the added step of standardizing the received pulses in order to extrapolate the initial position and amplitude relative to said transmitted pulse.

8. The process of claim 6 and the added step of storing a sample of each ranging pulse, as it is received whereby the average of said stored samples represents the average of said received pulses, and means responsive to said stored samples for controlling the shape of said received pulses.

9. The process of claim 8 and means responsive only to the receipt of ranging pulses of a preselected pulse repetition rate for storing said samples.

* * * * *